(12) United States Patent
Chou et al.

(10) Patent No.: US 7,519,829 B2
(45) Date of Patent: Apr. 14, 2009

(54) STORAGE DEVICE AND METHOD FOR PROTECTING DATA STORED THEREIN

(75) Inventors: Bruce C. S. Chou, Hsin Chu (TW); Jer-Wei Chang, Hsin Chu (TW)

(73) Assignee: EGIS Technology Inc., Taipei (TW)

( * ) Notice: Subject to any disclaimer, the term of this patent is extended or adjusted under 35 U.S.C. 154(b) by 219 days.

(21) Appl. No.: 11/453,136

(22) Filed: Jun. 15, 2006

(65) Prior Publication Data
US 2007/0067641 A1    Mar. 22, 2007

(30) Foreign Application Priority Data
Jun. 17, 2005    (TW) ............................... 94120127 A

(51) Int. Cl.
*G06F 21/00*    (2006.01)
(52) U.S. Cl. ........................... 713/186; 713/187; 726/5; 726/27; 382/115; 382/124
(58) Field of Classification Search ................ 713/186, 713/187; 726/5, 27; 382/115, 124
See application file for complete search history.

(56) References Cited

U.S. PATENT DOCUMENTS

| | | | |
|---|---|---|---|
| 4,582,985 A | | 4/1986 | Löfberg |
| 5,053,608 A | * | 10/1991 | Senanayake ................ 235/380 |
| 5,229,764 A | * | 7/1993 | Matchett et al. ............ 340/5.52 |
| 5,623,552 A | * | 4/1997 | Lane ........................... 382/124 |
| 5,995,014 A | * | 11/1999 | DiMaria ..................... 340/5.52 |
| 6,011,858 A | * | 1/2000 | Stock et al. ................. 382/115 |
| 6,167,517 A | * | 12/2000 | Gilchrist et al. ............. 713/186 |
| 6,208,264 B1 | * | 3/2001 | Bradney et al. ............. 340/5.2 |
| 6,219,439 B1 | * | 4/2001 | Burger ........................ 382/115 |

(Continued)

FOREIGN PATENT DOCUMENTS

CN    1302018 A    7/2001

(Continued)

OTHER PUBLICATIONS

Federal Information Processing Standards Publication 190; "Guideline For The Use Of Advanced Authentication Technology Alternatives" (FIPS PUB 190); Sep. 28, 1994; pp. 1-79.*

*Primary Examiner*—Carl Colin
(74) *Attorney, Agent, or Firm*—Muncy, Geissler, Olds & Lowe, PLLC

(57) ABSTRACT

A storage device to be connected to a terminal host includes a control module to be connected to the host, and a biometrics sensor and a storage unit both connected to the control module. The host runs a biometrics application program (AP) to inform the control module to control the sensor to read to-be-identified biometrics data of a user and to determine whether the to-be-identified biometrics data matches with biometrics template data stored in the storage device. When the two sets of data match with each other, the host runs a host-specific-code generating program to generate and transfer a host specific code to the control module. The control module generates a device specific code using a device-specific-code generating program stored therein, determines whether the codes match with each other, and enables the host to access a data protection unit of the storage device when the codes match with each other.

20 Claims, 4 Drawing Sheets

U.S. PATENT DOCUMENTS

| | | | |
|---|---|---|---|
| 6,572,014 B1 * | 6/2003 | Lambert | 235/380 |
| 6,624,739 B1 * | 9/2003 | Stobbe | 340/5.2 |
| 6,744,910 B1 * | 6/2004 | McClurg et al. | 382/124 |
| 6,775,776 B1 * | 8/2004 | Vogt et al. | 713/186 |
| 6,819,219 B1 * | 11/2004 | Bolle et al. | 340/5.52 |
| 6,853,739 B2 * | 2/2005 | Kyle | 382/115 |
| 6,952,489 B1 * | 10/2005 | Angelo et al. | 382/124 |
| 7,114,051 B2 * | 9/2006 | Guu et al. | 711/173 |
| 7,197,168 B2 * | 3/2007 | Russo | 382/125 |
| 7,274,807 B2 * | 9/2007 | Hillhouse et al. | 382/124 |
| 7,277,562 B2 * | 10/2007 | Zyzdryn | 382/124 |
| 7,310,432 B2 * | 12/2007 | Xu | 382/115 |
| 7,310,734 B2 * | 12/2007 | Boate et al. | 713/186 |
| 2001/0023375 A1 | 9/2001 | Shen | |
| 2002/0097142 A1 * | 7/2002 | Janiak et al. | 340/5.53 |
| 2002/0111213 A1 * | 8/2002 | McEntee et al. | 463/42 |
| 2003/0053337 A1 | 3/2003 | Murata | |
| 2003/0110389 A1 | 6/2003 | Elteto | |
| 2003/0190061 A1 | 10/2003 | Chou et al. | |
| 2003/0215976 A1 | 11/2003 | Chou et al. | |
| 2004/0025031 A1 * | 2/2004 | Ooi et al. | 713/186 |
| 2004/0044897 A1 * | 3/2004 | Lim | 713/186 |
| 2004/0046574 A1 | 3/2004 | Chou | |
| 2004/0068669 A1 * | 4/2004 | Uchida | 713/202 |
| 2004/0128520 A1 * | 7/2004 | LaCous | 713/186 |
| 2004/0208345 A1 | 10/2004 | Chou et al. | |
| 2004/0208348 A1 * | 10/2004 | Baharav et al. | 382/124 |
| 2004/0260657 A1 * | 12/2004 | Cockerham | 705/76 |
| 2005/0091338 A1 * | 4/2005 | de la Huerga | 709/217 |
| 2005/0144464 A1 | 6/2005 | Chiu et al. | |
| 2005/0244037 A1 | 11/2005 | Chiu et al. | |
| 2006/0129838 A1 * | 6/2006 | Chen et al. | 713/186 |
| 2006/0149971 A1 * | 7/2006 | Kozlay | 713/186 |

FOREIGN PATENT DOCUMENTS

| | | |
|---|---|---|
| EP | 1 204 079 A1 | 5/2002 |
| GB | 2 387 933 A | 10/2003 |
| WO | WO-02/42887 A2 | 5/2002 |

* cited by examiner

STORAGE DEVICE AND METHOD FOR PROTECTING DATA STORED THEREIN

BACKGROUND OF THE INVENTION

1. Field of the Invention

The invention relates to a storage device and a method of protecting data stored therein, and more particularly to a storage device having a biometrics sensor and a method of protecting data stored therein. The invention also correlates to the commonly assigned patents: (a) U.S. patent application Ser. No. 10/998,722 (US20050144464A1), filed on Nov. 30, 2004, and entitled "MEMORY STORAGE DEVICE WITH A FINGERPRINT SENSOR AND METHOD FOR PROTECTING THE DATA THEREIN"; (b) U.S. patent application Ser. No. 11/115,212 (US20050244037A1), filed on Apr. 27, 2005 and entitled "PORTABLE ENCRYPTED STORAGE DEVICE WITH BIOMETRIC IDENTIFICATION AND METHOD FOR PROTECTING THE DATA THEREIN"; and (c) U.S. patent application Ser. No. 11/332,167, filed on Jan. 17, 2006 and entitled "STORAGE DEVICE AND METHOD FOR PROTECTING DATA STORED THEREIN".

2. Description of the Related Art

In the prior art, the exhibit, such as an identification card, a driving license, or the like, is the simplest way to represent the personal authentication, and the personal photo, characters and numbers are recorded on the exhibit. However, the identification card can be easily counterfeited, and several criminal acts have been induced accordingly.

An advanced method is to utilize the magnetic-stripe card to record the personal data. Similarly, the advanced technology makes the magnetic-stripe card be easily cracked.

The newest method is to utilize the chip card to protect the personal data. Basically, the password protection is frequently used to protect the personal data of the memory chip. However, using the password to protect the personal data is troublesome because the user tends to forget the password and the password may also be easily copied and attacked.

Meanwhile, the above-mentioned device (exclusive of the chip card) for representing the personal authentication only can execute a single function and a single application.

U.S. Patent Publication No. 2003/0110389 A1 discloses a personal ID electric device similar to a solid-state mobile disk, wherein the device contains encrypted personal data and can be directly connected to the computer system. However, this device has to be enabled after the password is checked and thus encounters the above-mentioned problems. A best way to solve the problem is to provide a complete and effective data protection method based on the authentication of the biometrics features, such as the fingerprint, voice, signature, eye iris, and the like. The advantages are that the biometrics feature is always kept on the user and the user does not need to memorize the feature, the biometrics feature cannot be stolen, and the biometrics feature protection method is strict and very convenient Recently, owing to the invention of the chip-type biometrics sensor, the miniaturized electrical product incorporated with the biometrics authentication device becomes the technology that can be implemented. The associated technology can be found in the following patents to one of the inventors: (a) U.S. patent application Ser. No. 10/403,052 (US20030190061A1), filed on Apr. 1, 2003, entitled "CAPACITIVE FINGERPRINT SENSOR"; (b) U.S. patent application Ser. No. 10/434,833 (US20030215976A1), filed on May 13, 2003, entitled "PRESSURE TYPE FINGERPRINT SENSOR FABRICATION METHOD"; (c) U.S. patent application Ser. No. 10/414,214 (US20040208345A1), filed on Apr. 16, 2003, and entitled "THERMOELECTRIC SENSOR FOR FINGERPRINT THERMAL IMAGING"; and (d) U.S. patent application Ser. No. 10/638,371 (US20040046574A1), filed on Aug. 12, 2003, and entitled "CAPACITIVE MICRO PRESSURE SENSING MEMBER AND FINGERPRINT SENSOR USING THE SAME". Thus, span personal applications, such as the portable electrical products with the biometrics authentication function, have been developed.

U.S. Pat. No. 4,582,985 issued on Apr. 15, 1986 has disclosed a personal data protection method, in which the personal data stored in the ID card device is protected by way of biometrics authentication. The protected data stored in the card device can be outputted for the subsequent processing or authentication procedures only after the biometrics authentication procedure passes. The dimension of this device is the same as that of the generally used credit card. This device, which is a completely stand-along biometrics authentication device because the biometrics capture and authentication are performed in the same device, includes a biometrics sensor, an image processing and authentication module, and a memory.

China Patent No. CN1302018A discloses a method of controlling the rights of reading and writing a data storage device according to the biometrics authentication. However, this patent does not clearly disclose the format and interface of this storage device.

Similarly, EP124079A1 also discloses a data protection concept similar to the '985 patent except that the communication interface thereof is a golden finger interface used in a SD card. In addition, the memory device of the '079 patent has a biometrics authentication module, and the data protection concept is the same as the '018 patent. Similarly, US2001/0023375A1 also discloses a method of protecting the data stored in the hard drive or flash disk according to the biometrics authentication.

WO 02/42887A2 patent discloses a data protection concept similar to the '985 patent and '079 patent except that the device of the '887 patent communicates the terminal system through the USB interface. This device is similar to the flash memory hard drive popularized in the current market except for the stand-along biometrics processing and identifying module.

U.S. Patent publication No. 2003/005337 discloses the data protection concept of a stand-along biometrics authentication module, which is the same as the '985 and '079 patents, and utilizes the USB as the communication interface, which is the same as that disclosed in the '887 patent Similarly, the device of '337 patent is also a stand-along biometrics authentication device.

GB2387933 patent also discloses a stand-along biometrics authentication device, which has a concept and device design almost similar to those of the '887 and '337 patents, wherein the biometrics capture and authentication are performed in the same device.

Heretofore, in the above-mentioned biometrics authentication devices, the '985 patent discloses the application to the personal authentication card, while the other patents are only used to protect data.

In addition, the basic requirement of the above-mentioned portable storage devices with the biometrics authentication function is to facilitate the user to connect one of these storage devices to various computer systems. However, even if the USB interface is used, the biometrics related application program still has to be manually executed in the computer system first before it is used such that the computer system can provide a human-machine interface for the user. The conventional method is to provide an optical disk to execute the biometrics related application program and enable the storage device to be used. In this case, each time when the computer systems are firstly set, the user has to carry the portable storage device together with the optical disk so that he or she can use the storage device in other computer systems.

To sum up, the object of the above-mentioned prior arts is to provide a storage device for protecting data stored therein by way of biometrics authentication. When the device is used, the user has to execute the biometrics application software in the terminal system in advance. Thus, the biometrics application program of the storage device cannot be conveniently used in a plug-and-play manner over various computers.

Heretofore, the prior arts have a common feature of providing a stand-along biometrics authentication device including a biometrics sensor, and a biometrics image processing and authentication IC. Such a design is intuitive and easily implemented and there is no need to install the biometrics application program in the terminal system and the convenience of plug-and-play function may be provided. However, the prior art devices have an important problem of the high price because a biometrics image processing and authentication IC and its associated memory components have to be utilized. Usually, the IC is the 32-bit RISC or DSP in order to perform the biometrics authentication effectively. Consequently, the conventional portable storage device with a biometrics sensor has the drawback of high cost.

In order to solve the high cost problem, it is preferred to utilize the microprocessor of the terminal host to execute the biometrics image processing and authentication so as to reduce the cost effectively. However, the prior arts do not provide a definite solution.

If the biometrics image processing and authentication works are to be transferred from the storage device to the CPU of the terminal system, the disclosed device must have the functions of causing the biometrics application program, which includes the biometrics image processing, authentication and encrypting/decrypting sub-programs, and a biometrics matching program, to be automatically run or executed in the terminal system so as to achieve the plug-and-play function and facilitate the usage in any other terminal system. The above-mentioned prior arts, however, do not provide this solution.

Alternatively, as shown in U.S. Patent Publication No. 2003/005337, it is possible to install the biometrics processing and authentication programs in the terminal system. Such a design, however, disables the user from using the device over various terminal systems, or the user has to spend time to laboriously install the driver and application programs first in the terminal systems before using. The conventional method is to provide an optical disk for storing the drivers for the memory and the drivers for the biometrics sensor of the storage device so that the user can install the suitable drivers and enable the storage device to be used. In this case, each time when the computer systems are firstly set, the user has to carry the portable storage device together with the optical disk so that he or she can use the storage device in other computer systems. Although it is possible to download the driver through the network, it is not a convenient way because some computers cannot connect to the network.

Consequently, the inventor of this invention discloses, in the above-mentioned (a) and (b) patents, a method of automatically running a biometrics authentication and application program in a terminal system, wherein the storage device is divided into several regions, and one of the regions is simulated into a CD-ROM such that the terminal system regards this region as a CD-ROM device. The biometrics authentication and application program stored in this region may be run automatically. Thus, the prior art problems of high cost and installing biometrics authentication software in the computer in advance can be solved.

In the above-mentioned patents (a) and (b), the biometrics images are processed and compared in the terminal system. After the comparison passes, a special command is outputted to inform the storage device to open the read/write authority.

Such a design still has some drawbacks. If someone can intercept the special command in the terminal host, the security of the storage device will be cracked because no biometrics matching has to be performed.

To extend the above-mentioned (a) and (b) patents, the inventor further provides a method of protecting stored data, in which the key of the terminal system for opening the storage device is from being intercepted.

SUMMARY OF THE INVENTION

It is therefore an object of the invention to provide a storage device and a method of protecting data stored therein. The storage device is connected to a terminal host and cooperates with the terminal host to provide a method of protecting data stored in the storage device effectively without adding too much cost.

Another object of the invention is to provide a storage device and a method of protecting data stored therein, wherein the device and method can prevent a special instruction for the terminal host to enable the storage device from being intercepted.

To achieve the above-identified objects, the invention provides a storage device to be connected to a terminal host for running a biometrics application program and a host-specific-code generating program. The storage device basically includes a host interface, a control module, a biometrics sensor, a data protection unit and a storage unit. The host interface is to be connected to the terminal host. The control module is connected to the host interface and includes a microprocessor, a random access memory (RAM) and a read only memory (ROM). The RAM serves as a working memory for data processing, and the ROM stores firmware for enabling the storage device to work and a device-specific-code generating program. The biometrics sensor, which is connected to the control module, senses to-be-identified biometrics data of a user. The data protection unit, which is connected to the control module, stores to-be-protected data. The storage unit, which is connected to the control module, stores biometrics template data. The biometrics template data is transferred to the terminal host through the microprocessor of the control module. The control module controls the biometrics sensor to read the to-be-identified biometrics data of the user and to transfer the to-be-identified biometrics data to the terminal host according to the biometrics application program. The terminal host executes the biometrics application program to process and determine whether the to-be-identified biometrics data matches with the biometrics template data, executes the host-specific-code generating program to generate a host specific code when the two sets of data substantially match with each other, and transfers the host specific code back to the microprocessor. The microprocessor utilizes the device-specific-code generating program to generate a device specific code, determines whether the device specific code matches with the host specific code, and enables the data protection unit to be accessed when the codes substantially match with each other, or otherwise disables the data protection unit from being accessed by the terminal host.

DETAILED DESCRIPTION OF THE INVENTION

Figure 1:
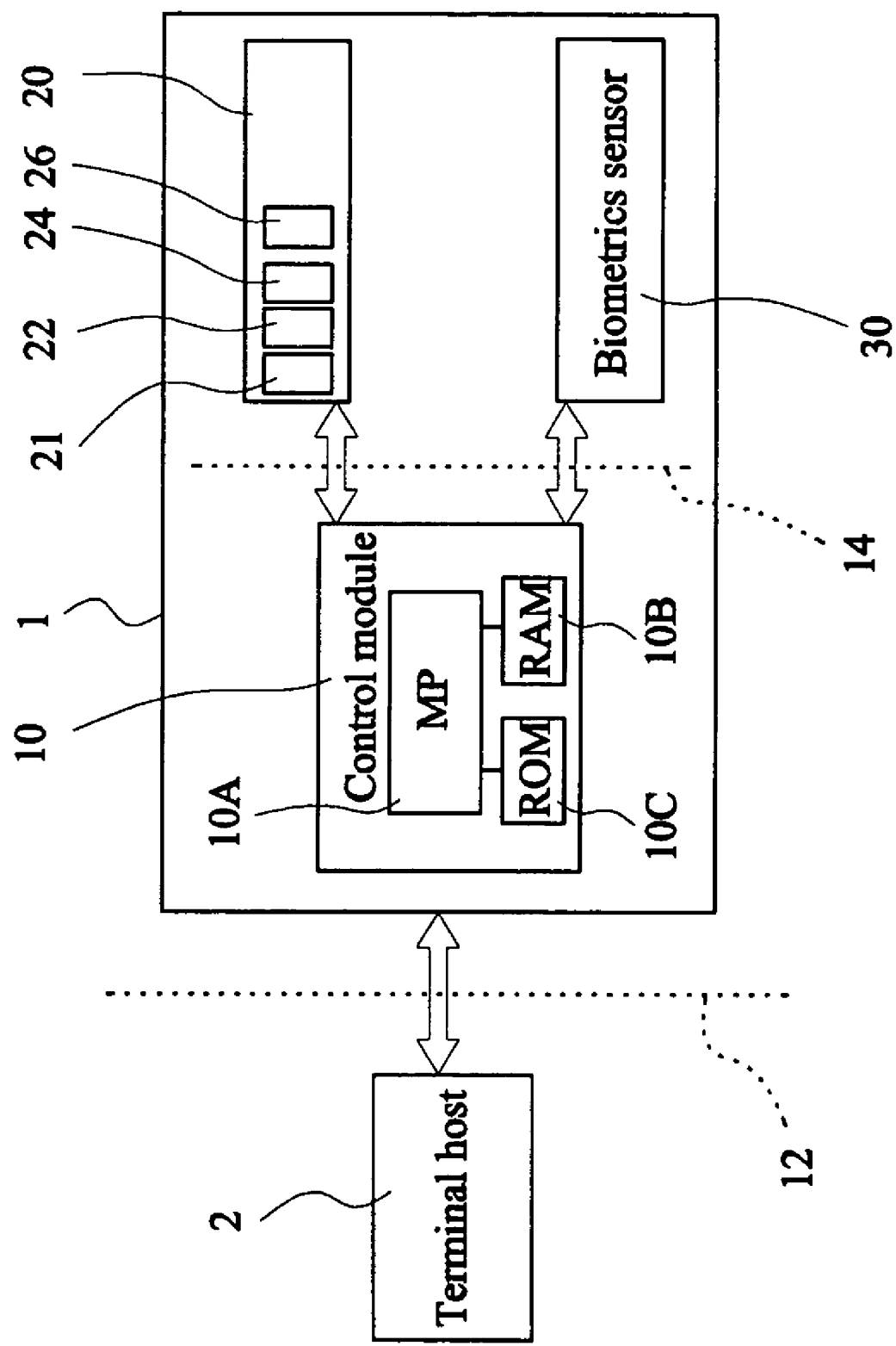
FIG. 1 is a schematic illustration showing a connection state of a storage device and a terminal host according to a first embodiment of the invention.

FIG. 1 is a schematic illustration showing a connection state of a storage device 1 and a terminal host 2 according to a first embodiment of the invention. Referring to FIG. 1, the storage device 1 of this embodiment is to be connected to the terminal host 2. The terminal host 2 runs a biometrics application program and a host-specific code generating program. The biometrics application program and the host-specific-code generating program may be stored in the storage device 1 in advance, and then the terminal host 2 runs the programs automatically or according to an instruction of the user.

The storage device 1 basically includes a host interface 12, a control module 10, a biometrics sensor 30, a storage unit 20 and a data protection unit 24. The host interface 12 is to be connected to the terminal host 2. The host interface 12 may be a universal serial bus (USB) interface, a PCMCIA interface, a SATA interface, a PCI express interface, an IEEE 1394 interface or any other standard interface. The control module 10 is connected to the host interface 12 and includes a microprocessor (MP) 10A, a random access memory (RAM) 10B and a read only memory (ROM) 10C. The RAM 10B serves as a working memory for data processing, and the ROM 10C stores firmware, which enables the storage device 1 to work, and a device-specific-code generating program. The microprocessor 10A, the RAM 10B and the ROM 10C may be integrated in a single chip. Thus, the control module 10 functions to communicate with the terminal host 2 and manage the storage unit 20 and the biometrics sensor 30.

The biometrics sensor 30 connected to the control module 10 via azi interface 14 senses to-be-identified biometrics data of a user. The biometrics sensor 30 may sense the biometrics data (e.g., fingerprint, iris, voice, signature or any other biometrics data) of the user. The biometrics sensor 30 in this embodiment is a fingerprint sensor, particularly a chip-type fingerprint sensor including an area type fingerprint sensor and a sweep type fingerprint sensor. The biometrics sensor 30 also may be any other type of sensor, such as a voice sensor, an optical image sensor like CCD or CMOS image sensor for face recognition or an iris pattern sensing or any other biometrics sensor like finger or palm vein sensor. In the following embodiments, the fingerprint sensor will be described.

The storage unit 20 connected to the control module 10 stores biometrics template data and a specific key, which may be momentarily updated. Alternatively, the specific key may be generated by a biometrics application program without being stored in the storage unit 20. The so-called biometrics template data is the biometrics data of the owner of the storage device 1 when he or she uses this device at the first time. The biometrics data serves as a matching reference for the subsequent biometrics data. The storage unit 20 may be a memory module, a hard drive or an optical drive. The memory module may be, for example, a non-volatile memory, such as a flash memory, a programmable read only memory (PROM), a read only memory, or an EEPROM (Read Only Memory). In this embodiment, the storage unit 20 is divided into an application program block 21, a public block 22, a private block 24 and a hidden block 26. The private block 24, which serves as the data protection unit and is thus connected to the control module 10, stores to-be-protected data. When the terminal host 2 wants to automatically run the biometrics application program and the host-specific-code generating program, the biometrics application program and the host-specific-code generating program may be stored in the application program block 21. In addition, the application program block 21 is designed as an optical drive storage device such that the terminal host 2 connected to the storage device 1 can automatically run the biometrics application program and the host-specific-code generating program. The host-specific-code generating program and the device-specific-code generating program have the same program logic. That is, the two programs can generate the same specific code according to the same specific key, wherein the specific code includes a feature data code, a random code and a look-up-table code obtained from a look-up table. The public block 22, which may be omitted in another embodiment, may store public programs and public data such that the user can access the public programs and data without passing the biometrics authentication procedure. In one embodiment, the biometrics template data and the specific key is stored in the hidden block 26. In another embodiment, the specific key is not stored in the hidden block 26 in advance, but is generated by the biometrics application program according to the fingerprint feature points obtained from the to-be-identified biometrics data, or generated according to the fingerprint feature points and a mathematical operation. The so-called momentarily updating specific key may be an initial value provided to the host and the device-specific-code generating program, and the specific key of the momentarily update may be updated after the host specific code substantially matches with the device specific code such that the storage device cannot be easily cracked.

When the storage device 1 is connected to the terminal host 2, the biometrics template data and the momentarily updating specific key are uploaded or transferred to the terminal host 2 through the microprocessor 10A of the control module 10. Then, the control module 10 controls the biometrics sensor 30 to read the to-be-identified biometrics data of the user under the guidance of the biometrics application program executed by the terminal host 2, and transfers the to-be-identified biometrics data to the terminal host 2. Next, the terminal host 2 utilizes the biometrics application program to process and determine whether the to-be-identified biometrics data substantially matches with the biometrics template data, and to generate a host specific code, which is transferred back to the microprocessor 10A, using the host-specific-code generating program according to the momentarily updating specific key when the two sets of data substantially match with each other. The host specific code may be transferred back directly, after being encrypted (the microprocessor 10A has to decrypt the code for matching), or together with the communication protocol (e.g., the communication protocol communicating with the USB controller). If the specific key is generated by the biometrics application program, it may be transferred back in a manner like the host specific code. It is to be noted that the biometrics data can be matched by way of image matching or feature point matching. Then, the microprocessor 10A utilizes the device-specific-code generating program to generate a device specific code according to the momentarily updating specific key, and to determine whether the device specific code substantially matches with the host specific code in the microprocessor. If a match occurs, the data protection unit 24 is enabled to be accessed by the terminal host 2, or otherwise the data protection unit 24 is disabled from being accessed by the terminal host 2. It is to be noted that generating the device specific code and the host-specific-code generating program according to the specific key is only to enhance the protection level of the invention. In face, the device specific code and the host characteristic code can be generated according to the default logic without any specific key.

Figure 2:
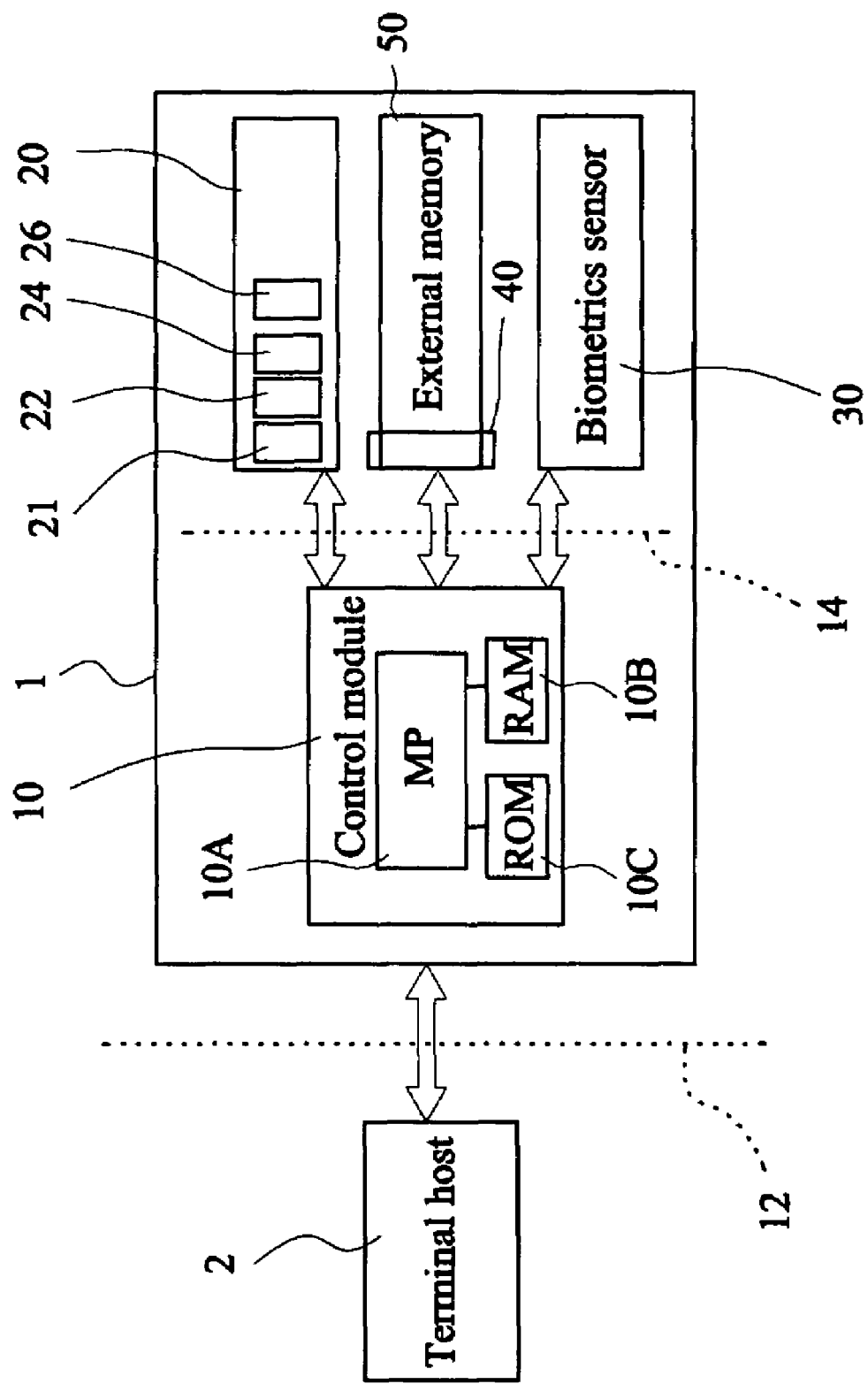
FIG. 2 is a schematic illustration showing a connection state of a storage device and a terminal host according to a second embodiment of the invention.

FIG. 2 is a schematic illustration showing a connection state of a storage device and a terminal host according to a second embodiment of the invention. As shown in FIG. 2, this embodiment is similar to the first embodiment except that the storage device 1 of the second embodiment further includes a memory expansion slot 40, which is electrically connected to the control module 10 and to be electrically connected to an external memory 50 in order to increase the memory capacity of the storage device 1. The memory expansion slot 40 substantially expands the memory capacity of the invention device. Alternatively, the invention device is treated as a memory reader for an external memory 50, which may be, for example, a CF card, a smart media, a memory stick, any other external memory with the standard interface, or a hard disk (especially a 1" or smaller hard drive called as a microdrive). The external memory 50 is enabled to be accessed by the terminal host 2 when the device specific code substantially matches with the host specific code. After the external memory 50 is inserted into the memory expansion slot 40, the control module 10 formats the external memory into a single expansion private block for storing extra to-be-protected data.

In addition, the external memory 50 of FIG. 2 may individually serve as the data protection unit, which is connected to the control module 10 through the memory expansion slot 40. In this case, the private block 24 of the storage unit 20 can be omitted. After the external memory 50 is inserted into the memory expansion slot 40, the control module 10 formats the external memory into a single expansion private block for storing the to-be-protected data.

Figure 3:
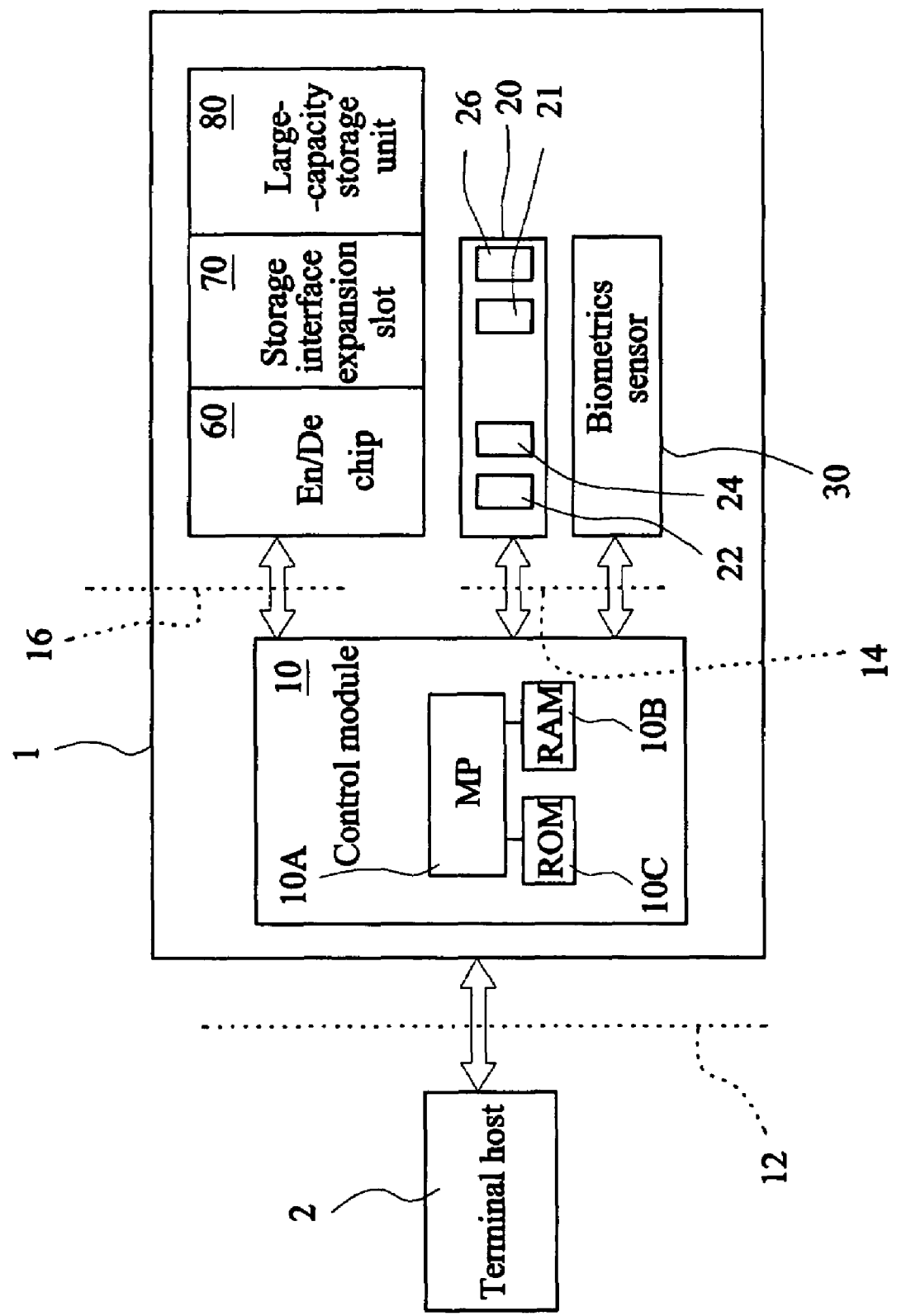
FIG. 3 is a schematic illustration showing a connection state of a storage device and a terminal host according to a third embodiment of the invention.

FIG. 3 is a schematic illustration showing a connection state of a storage device and a terminal host according to a third embodiment of the invention. As shown in FIG. 3, this embodiment is similar to the first embodiment except that the storage device 1 of this embodiment further includes a storage interface expansion slot 70 for electrically connecting a large-capacity storage unit 80 to the control module 10 so as to provide a storage capacity for the storage device 1. An encrypting/decrypting chip (En/De chip) 60 is connected to the control module 10 through a storage interface 16. The storage interface expansion slot 70 is connected to the encrypting/decrypting chip 60. The large-capacity storage unit 80 is connected to the control module 10 through the storage interface expansion slot 70 and the encrypting/decrypting chip 60. The large-capacity storage unit 80 is enabled to be accessed by the terminal host 2 when the device specific code substantially matches with the host specific code. The data inputted into or outputted from the large-capacity storage unit 80 may be encrypted/decrypted by the encrypting/decrypting chip 60. In one embodiment, the large-capacity storage unit 80 is a magnetic hard drive, especially a 3.5" hard drive, a 2.5" hard drive or a hard drive with any other dimension. In another embodiment, the large-capacity storage unit 80 is an optical drive of CD-R/RW or DVD-R/RW or any other optical drive with any specification. The storage interface 16 and the storage interface expansion slot 70 have the IDE interface in this embodiment, but may have the SCSI interface, the Serial ATA interface, the Compact Flash (CF) interface, the PCMCIA interface, the IEEE 1284 interface or any other standard interface.

In addition, the large-capacity storage unit 80 of FIG. 3 may individually serve as the data protection unit. In this case, the private block 24 of the storage unit 20 may be omitted. The data protection unit is connected to the control module 10 through the storage interface expansion slot 70. In addition, the large-capacity storage unit 80, which is further connected to the control module 10 through the encrypting/decrypting chip 60, encrypts/decrypts the data inputted into or outputted from the large-capacity storage unit 80.

Figure 4:
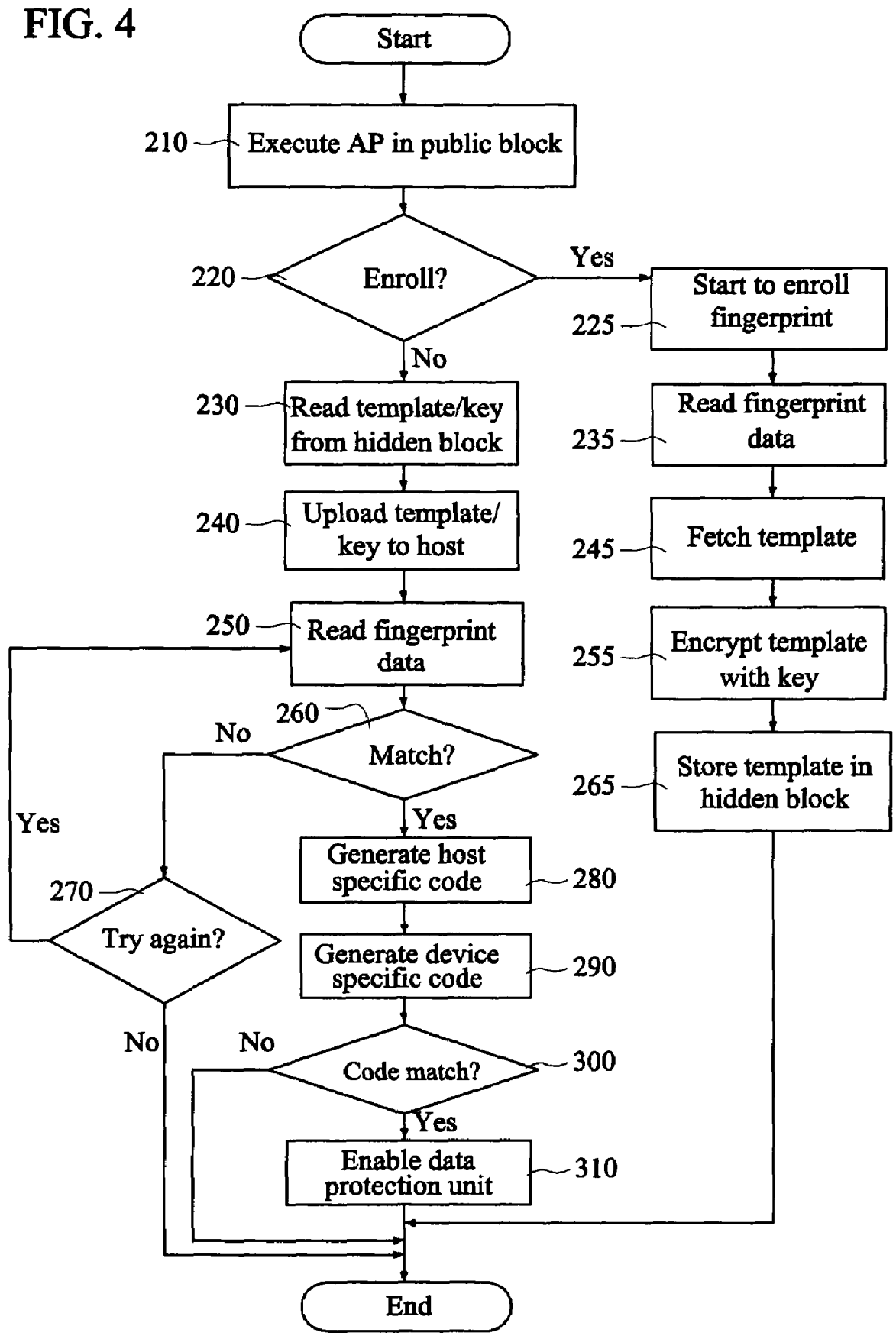
FIG. 4 is a flow chart showing a protection method of a storage device according to a fourth embodiment of the invention.

FIG. 4 is a flow chart showing a protection method of a storage device according to a fourth embodiment of the invention. As shown in FIG. 4, the method of protecting data stored in the storage device 1 includes the following steps.

First, the storage device 1 is connected to the terminal host 2 through the host interface 12 of the storage device 1 after the storage device 1 is inserted into the terminal host 2. Then, the terminal host 2 runs the biometrics application program, as shown in step 210. Next, the biometrics application program automatically judges whether the storage device 1 is used at the first time, and asks the user whether he or she wants to enroll the biometrics data if yes, as shown in step 220. If the user selects to enroll the data, the procedure starts to enroll the fingerprint, as shown in step 225. In this case, the biometrics sensor 30 senses the biometrics data of the user, as shown in step 235, and then fetches the biometrics template data, as shown in step 245. Next, the template is encrypted according to the key, as shown in step 255. Then, the biometrics template data is stored in the hidden block 26.

When the biometrics application program has detected that the hidden block 26 stores the biometrics template data, the storage device 1 transfers the biometrics template data stored in the storage device 1 and the momentarily updating specific key to the terminal host 2, as shown in steps 230 and 240. Then, the biometrics application program guides the user to use the biometrics sensor 30 of the storage device 1 such that the biometrics sensor 30 captures the to-be-identified biometrics data of the user and transfers the to-be-identified biometrics data to the terminal host 2, as shown in step 250. Next, the biometrics application program processes and determines whether the to-be-identified biometrics data matches with the biometrics template data, as shown in step 260. If they do not substantially match with each other, the program asks the user whether he or she wants to try again, as shown in step 270. If the user selects not to tray again, the overall procedure ends. If the user wants to try again, the procedure goes back to step 250. If the two sets of data substantially match with each other, the host-specific-code generating program generates the host specific code according to the momentarily updating specific key and transfers the host specific code back to the storage device 1, as shown in step 280.

Then, the storage device 1 generates the device specific code by executing the device-specific-code generating program stored therein according to the momentarily updating specific key, as shown in step 290. Next, the program determines whether the device specific code and the host specific code substantially match with each other, as shown in step 300. When the device specific code substantially matches with the host specific code, the data protection unit 24/50/80 of the storage device 1 is enabled to be accessed by the terminal host 2, as shown in step 310. Otherwise, the data protection unit 24/50/80 is disabled from being accessed by the terminal host 2 and the procedure ends.

It is to be noted that this method can be applied to the three embodiments, and detailed descriptions thereof will be omitted.

According to the device and method of the invention, the storage device does not need any advanced microprocessor because the complicated matching operation of the biometrics data is executed in the terminal host. In addition, the signal outputted by the terminal host after the two sets of biometrics data match with each other is not the signal for opening the to-be-protected data, but is a varying signal, which cannot directly expose the to-be-protected data even if it is intercepted. This is because the operations of enabling and disabling the data protection unit are performed in the control module, and the data to be compared by the control module includes two varying specific codes. The management authority for the data confidentiality unit cannot be opened until the two specific codes match with each other. So, it is possible to prevent the data from being crack effectively. The comparison of the specific codes is very simple. For example, the microprocessor such as the 8051 processor can make the comparison. Thus, the invention possesses the advantages of the stand-along device without adding the cost.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A storage device to be connected to a terminal host, which runs a biometrics application program and a host-specific-code generating program, the storage device comprising:
    a host interface to be connected to the terminal host;
    a control module, which is connected to the host interface and comprises a microprocessor, a random access memory (RAM) and a read only memory (ROM), wherein the RAM serves as a working memory for data processing, and the ROM stores firmware for enabling the storage device to work and a device-specific-code generating program;
    a biometrics sensor, which is connected to the control module, for sensing to-be-identified biometrics data of a user;
    a data protection unit, which is connected to the control module, for storing to-be-protected data; and
    a storage unit, which is connected to the control module, for storing biometrics template data, wherein:
    the biometrics template data is transferred to the terminal host through the microprocessor of the control module;
    the control module controls the biometrics sensor to read the to-be-identified biometrics data of the user and to transfer the to-be-identified biometrics data to the terminal host according to the biometrics application program;
    the terminal host executes the biometrics application program to process and determine whether the to-be-identified biometrics data matches with the biometrics template data, executes the host-specific-code generating program to generate a host specific code when the to-be-identified biometrics data matches with the biometrics template data, and transfers the host specific code back to the microprocessor; and
    the microprocessor utilizes the device-specific-code generating program to generate a device specific code, determines whether the device specific code matches with the host specific code, and enables the data protection unit to be accessed when the codes substantially match with each other, or otherwise disables the data protection unit from being accessed by the terminal host without the device specific code being transferred back to the terminal host.

2. The device according to claim 1, wherein the data protection unit is a private block of the storage unit.

3. The device according to claim 1, further comprising:
    a memory expansion slot electrically connected to the control module and to be electrically connected to an external memory to increase a memory capacity of the storage device, wherein the external memory is enable to be accessed by the terminal host when the device specific code substantially matches with the host specific code.

4. The device according to claim 3, wherein the control module formats the external memory into a single expansion private block for storing extra to-be-protected data after the external memory is inserted into the memory expansion slot.

5. The device according to claim 1, further comprising:
    a storage interface expansion slot for electrically connecting a large-capacity storage unit to the control module so as to provide a storage capacity for the storage device, wherein the large-capacity storage unit is enabled to be accessed by the terminal host when the device specific code and the host specific code substantially match with each other.

6. The device according to claim 5, wherein the large-capacity storage unit is a magnetic hard drive or an optical disk device.

7. The device according to claim 1, wherein the data protection unit is an external memory connected to the control module through a memory expansion slot.

8. The device according to claim 7, wherein the control module formats the external memory into a single expansion private block for storing the to-be-protected data after the external memory is inserted into the memory expansion slot.

9. The device according to claim 1, wherein the data protection unit is a large-capacity storage unit, which is connected to the control module through a storage interface expansion slot.

10. The device according to claim 9, wherein the large-capacity storage unit is further connected to the control module through an encrypting/decrypting chip for encrypting/decrypting data inputted into or outputted from the large-capacity storage unit.

11. The device according to claim 9, wherein the large-capacity storage unit is a magnetic hard drive or an optical disk device.

12. The device according to claim 1, wherein the biometrics application program and the host-specific-code generating program are stored in an application program block of the storage unit.

13. The device according to claim 12, wherein the application program block is designed as an optical drive storage device to enable the terminal host connected to the storage device to automatically run the biometrics application program and the host-specific-code generating program.

14. The device according to claim 1, wherein the host-specific-code generating program and the device-specific-code generating program have the same program logic.

15. A method of protecting data stored in a storage device, the method comprising the steps of:
    connecting the storage device to a terminal host;
    running a biometrics application program in the terminal host;

transferring biometrics template data stored in the storage device to the terminal host;

guiding a user to use a biometrics sensor of the storage device, enabling the biometrics sensor to capture to-be-identified biometrics data of the user, and transferring the to-be-identified biometrics data to the terminal host;

utilizing the biometrics application program to process and determine whether the to-be-identified biometrics data matches with the biometrics template data, generating a host specific code using a host-specific-code generating program when the to-be-identified biometrics data substantially matches with the biometrics template data, and transferring the host specific code back to the storage device; and generating a device specific code using a device-specific-code generating program in the storage device, and enabling a data protection unit of the storage device to be accessed by the terminal host when a microprocessor of the storage device has determined that the device specific code substantially matches with the host specific code, or otherwise disables the data protection unit from being accessed by the terminal host without the device specific code being transferred back to the terminal host.

16. The method according to claim 15, wherein the data protection unit is an external memory connected to a control module of the storage device through a memory expansion slot, and the control module enables the data protection unit.

17. The method according to claim 16, wherein the control module formats the external memory into a single expansion private block for storing extra to-be-protected data after the external memory is inserted into the memory expansion slot.

18. The method according to claim 15, wherein the data protection unit is a large-capacity storage unit connected to a control module of the storage device through a storage interface expansion slot, the control module enables the data protection unit, the large-capacity storage unit is a magnetic hard drive or an optical disk device.

19. The method according to claim 15, wherein an application program block of a storage unit of the storage device is designed as an optical drive storage device for storing the biometrics application program and the host-specific-code generating program so as to enable the terminal host connected to the storage device to automatically run the biometrics application program and the host-specific-code generating program.

20. The method according to claim 15, wherein the host-specific-code generating program and the device-specific-code generating program have the same program logic.

* * * * *